United States Patent Office 3,451,222
Patented June 24, 1969

3,451,222
SPRAY-COOLED ROCKET ENGINE
George S. Kelley, Ridgewood, N.J., assignor to Curtiss-Wright Corporation, a corporation of Delaware
Filed Oct. 8, 1965, Ser. No. 494,209
Int. Cl. F02k 9/02; F02g 5/00; F02c 7/16
U.S. Cl. 60—258                                     5 Claims

ABSTRACT OF THE DISCLOSURE

A radially innermost layer of a liquid fuel rocket engine is made of a material which is highly thermally conductive at least in axial and radial directions. The radially inner surface of the layer defines the combustion chamber, nozzle, and nozzle throat portions of the engine and serves as a heat sink. A liquid combustible for the rocket engine, such as liquid fuel, is discharged onto a part of the surface of the combustion chamber thereby cooling that surface part and causing heat to be conducted away from and significantly cooling the nozzle throat portion.

---

Figure 1:
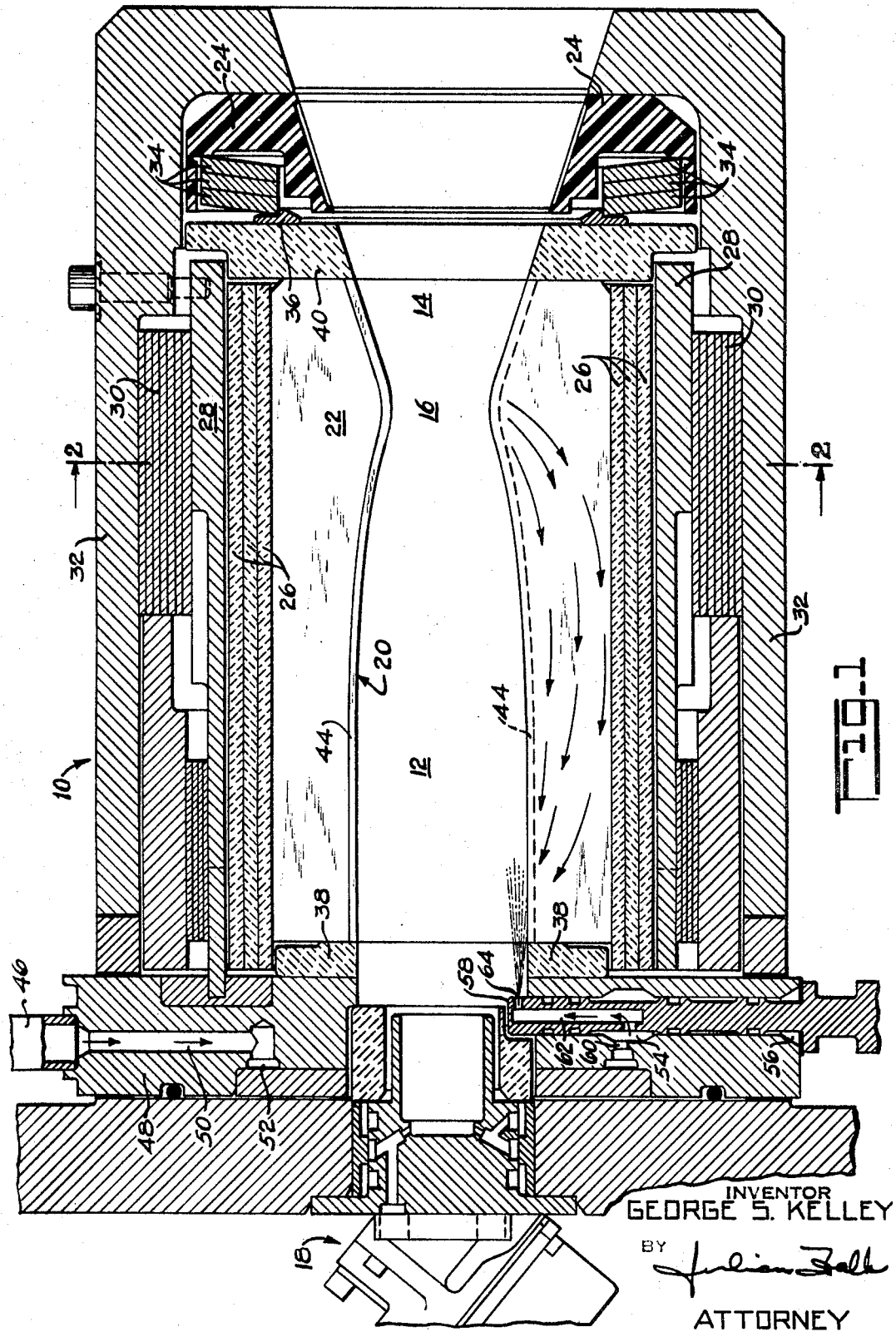

This invention relates to rocket engines or the like and is particularly directed to a cooling means for said engines.

A substantial portion of the progress in the field of rocket propulsion is presently being directed at the development of more energetic propellants. Accompanying the development of more energetic propellants is the increase in operating temperature ranges which necessitates an increase in the temperature range capabilities of the rocket engines and their components. Co-pending applications, Ser. No. 367,632, filed May 15, 1964, and Ser. No. 437,072, filed Mar. 4, 1965, both said applications being assigned to the same assignee as the present invention, are two examples of inventions directed toward increasing the operating temperature range capabilities of rocket engines.

The present invention is directed to a further improvement in increasing the operating temperature range of a rocket engine or the like. The invention is generally directed for use in aircraft parts or in a rocket structure, which may be an exhaust nozzle, a complete rocket engine or components thereof, wherein the inner surface or surface adjacent the gas flow path is composed of a material which is relatively highly thermally conductive at least in a direction parallel to the rocket engine axis and also preferably in a radial direction relative to said axis. The properties of the material used for the inner surface, as will be more fully explained below, provides for a heat conduction path in rocket structure which permits heat to be conducted away from the nozzle portion of the rocket engine or exhaust nozzle and means are also provided for removing the heat from the inner surface so that said nozzle throat portion does not reach a temperature wherein erosion of the nozzle throat portion will take place. It has been found that the temperature operating capabilities of rocket nozzles and the like can be substantially increased through the use of the novel construction of the present invention.

The present invention generally comprises a construction wherein fuel is sprayed onto the walls of the engine at its upstream end adjacent the fuel injectors. The resulting temperature reduction in the region where the fuel is sprayed onto the engine walls induces a flow of heat from the hot sections of the thrust chamber including the nozzle throat area toward the relatively cooler region. The cooling of the wall surfaces is produced at the point of fuel spray wherein the sprayed fuel absorbs the heat from the walls. The sprayed fuel after cooling the engine walls is then ignited in the combustion chamber to produce thrust along with the remaining fuel and oxidizer, in the case of a liquid propelled rocket, such that high combustion efficiency is brought about since all of the coolant is recombined in the combustion process before it passes through the exhaust nozzle throat.

Accordingly, it is one object of the invention to provide a novel and improved rocket engine structure which is capable of operating at substantially high temperatures.

It is another object of the invention to provide a novel and improved rocket engine structure including means for preventing erosion of the engine surfaces adjacent the gas flow path.

It is a further object of the invention to provide a spray cooling means for cooling the surfaces of a rocket engine exposed to the temperatures produced by combustion.

It is an additional object of the invention to provide a novel and improved cooling structure for a rocket engine or the like of the liquid propellant type wherein one of the propellants is used for cooling the surfaces of said engine exposed to combustion prior to combustion of said propellant.

Figure 2:
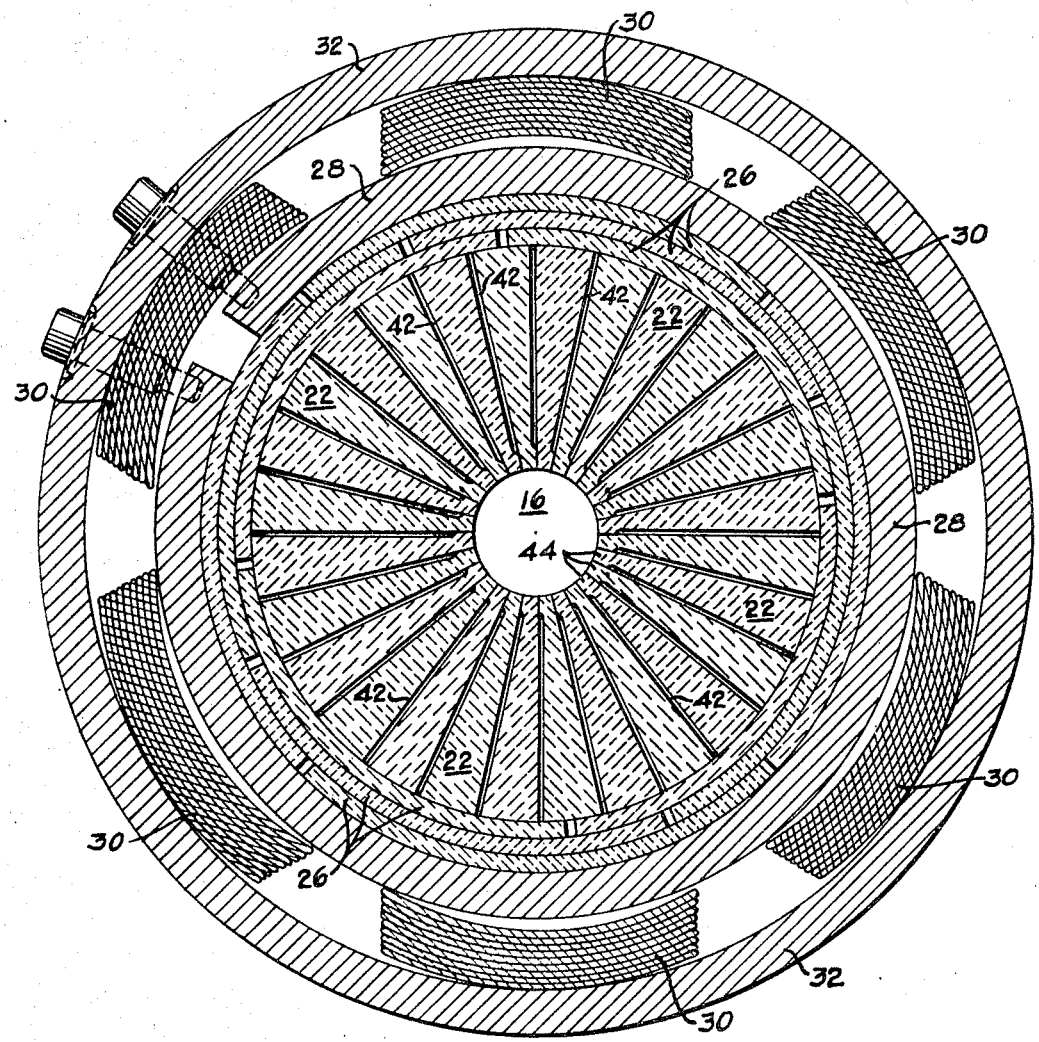

Other objects and advantages of the invention will become apparent upon reading the following detailed description with the accompanying drawings wherein:

FIG. 1 is an axial sectional view of a rocket engine illustrating the preferred embodiment of the invention; and FIG. 2 is a sectional view taken along 2—2 of FIG. 1.

In FIG. 1 there is illustrated a rocket engine 10 having a combustion chamber 12 and a discharge nozzle portion 14 including a nozzle throat portion 16. An injector assembly 18 is provided at the upstream end of the rocket engine 10 for injecting liquid propellants into the combustion chamber 12, which propellants are preferably of the hypergolic type. The injector assembly 18 is preferably of the swirl-cup type described in the above-mentioned co-pending application 437,072. However, the invention is not limited to the type injector system illustrated or to a liquid hypergolic fuel system.

The rocket engine 10 includes a first or inner annular layer which has a profile conforming to the profile of the inner surface of said rocket engine. The inner annular layer, generally designated at 20, is preferably composed of an anisotropic material which is oriented so that it is relatively highly thermally conductive in directions parallel and radial relative to the engine axis and relatively highly thermally nonconductive in a circumferential direction relative to said engine axis. The inner annular layer 20 may be further provided with a high temperature resistant coating on the inner surface thereof, if desired, said coating not being illustrated. Preferably, the inner annular layer 20 is composed of pyrolytic graphite or alloys thereof which material, as explained in co-pending application 437,072, has marked anisotropic properties. Reference may be made to said co-pending application for a more complete description of the formation and properties of pyrolytic graphite. However, it should be understood that, as will become apparent hereinafter, the invention is not limited to the use of anisotropic materials and may be carried out by using different materials having relatively high thermal conductivity.

The pyrolytic graphite inner layer 20 is preferably formed of a plurality of pyrolytic graphite wedge members 22 which are disposed circumferentially around the engine axis in abutting relationship at least at their inner surfaces, as illustrated in FIG. 2. Each of the wedges 22 is formed so that it is relatively highly thermally conductive in directions parallel and radial relative to the engine axis and relatively highly thermally nonconductive in a direction circumferential around the engine axis. As seen in FIG. 1, the wedges extend substantially the entire length of the rocket engine 10 and in particular make up the region of the nozzle throat portion 16. At the downstream end of the exhaust nozzle 14 the pyrolytic graphite wedges 22 may be cut off or shortened in this region since the temperatures at the discharge end are relatively lower and other materials may be used in this region. For this purpose, a nozzle extension member 24 may be secured to the rocket engine, which nozzle extension 24 is composed of a material having relatively lower temperature resistant characteristics and is provided with an inner surface which conforms to the profile of the discharge portion of the exhaust nozzle 14.

Referring to FIG. 2, it will be seen that, surrounding the outer periphery of the wedge structure, there are a plurality of insulating segments 26 which together form a plurality of concentric insulating rings around the inner annular layer 20. The segments 26 of the insulating layer are preferably formed of an anisotropic material such as pyrolytic graphite and are oriented so that said segments are relatively highly thermally nonconductive in the radial direction. Thus, it will be seen that the segments 26 serve to keep heat from being conducted radially outwardly from the inner annular layer 20 and the outer surface of the rocket engine will therefore be kept relatively cool. The insulating segments or layer also permit slight circumferential expansion and contraction at the radially outer surface of the inner annular layer 20. Surrounding the insulating segments 26 is an annular load-carrying layer which may comprise an annular cylindrically-shaped member or a wire-wrap structure or the like. Thus, the wedges 22 and the segments 26 are held together or supported by the load-carrying layer 28.

Pyrolytic graphite is also characterized by the fact that it has a relatively high rate of thermal expansion in the direction of relatively high thermal nonconductivity. In the case of the embodiment of FIG. 1, therefore, the inner annular layer 20 will have a relatively high rate of thermal expansion circumferentially relative to the engine axis. In order to compensate for the thermal expansion in the circumferential direction and for supporting the wedge structure against the internal pressures generated during operation of the rocket engine, leaf spring members 30 are disposed radially outwardly of the load-carrying layer 28, as illustrated in FIGS. 1 and 2. The spring members 30 are disposed radially between the load-carrying member 28 and an outer housing member 32 and provide a compression load to the wedge structure and permit limited or restrained expansion during operation of the rocket engine 10. Thus, the spring structure 30 will maintain alignment of the wedge members 22 relative to one another and also aid in maintaining the profile of the inner surface of the rocket engine. However, other means may be used in lieu of the spring members 30 such as an expansible layer or the like of the type disclosed in co-pending application Ser. No. 437,072. Belleville-type washers 34 may also be provided at the downstream end of the rocket engine in the nozzle extension 24, as illustrated, which Belleville washers 34 bear against a ring member or washer 36 to permit limited or restrained expansion of the wedge structure in the axial direction, although expansion in the axial direction is very slight in this type of structure. Annular ring members of pyrolytic graphite may be disposed at each axial end of the rocket engine 10, as illustrated at 38 and 40, which ring members 38 and 40 each are oriented so that they are relatively highly thermally nonconductive in the axial direction. The ring members 38 and 40 serve to limit the heat conduction axially from the inner layer 20 in order to keep the components adjacent to the rocket engine at each axial end relatively cool during operation.

As further illustrated in FIGS. 1 and 2, each wedge-shaped segment 22 of the inner annular layer 20 has an undercut portion 42 to permit slight circumferential expansion between adjacent wedge members 22 and adjacent the radially inner portion of each wedge-shaped segment 22 there is provided a land portion 44 which abuts with its adjacent wedge-shaped segment 22 to provide a gas-tight structure at the radially inner surface of the annular layer 20. As explained in co-pending application 437,072, the arrangement of the pyrolytic graphite inner layer 20, thus far described, provides for a rocket engine which is capable of operating at relatively long periods of time at substantially high temperatures without the inner surface subject to the gas flow becoming eroded. This is due to the fact that the heat is relatively rapidly conducted away from the nozzle throat portion, which is the portion subjected to the highest temperatures, before the surface of the nozzle throat portion reaches the erosion temperature for the material used. As will be explained hereinafter, the present invention further increases the operating temperature capabilities of rocket engines of this type by providing additional cooling means for conducting heat away from the hot sections of the engine.

As explained above, the rocket engine illustrated is preferably of the liquid fuel type wherein a fuel and oxidizer are combined for combustion in the combustion chamber 12. In the present invention a fuel line 46 is connected in a known manner to the outer housing 32, which fuel line 46 runs from a suitable source of fuel (not shown) such as that used for the injector assembly 18. As illustrated in FIG. 1, the fuel line 46 is connected to an end plate or housing wall portion 48 which has a fuel passageway 50 provided therein which connects the fuel line 46 to an annulus 52 provided in said housing 48. The annulus 52 communicates with a cavity 54 formed adjacent to a passageway 56 in the outer housing 48 which passageway 56 contains a spray bar assembly 58. A passageway 60 connects the annulus 52 with the cavity 54 and a passageway 62 in the spray bar assembly 58 connects the passageway 60 and cavity 54 to a fuel spray orifice 64. Preferably, a plurality of orifices such as that shown at 64 are provided in circumferentially spaced relationship around the nozzle axis, there being only one such orifice 64 being shown for purposes of illustration.

As is known in liquid fuel rocket engines, the fuel may be stored under pressure so that said fuel may be injected into the combustion chamber of the rocket engine for combustion therein or the fuel may be pump fed to the injectors. In the present invention the fuel, which may be supplied by either means is also supplied to the fuel line 46 and to the orifices 64 which are disposed adjacent to the injector end or upstream end of the rocket engine. The orifices 64 are constructed so that the fuel will be sprayed onto the walls of the inner surface of the rocket engine near the injector end or upstream end resulting in a temperature reduction of these surfaces. Due to the relatively high axial thermal conductivity of the materials preferably used in the present invention, the cooling of the inner surface at the upstream end will result in a flow of heat away from the high temperature region of the exhaust nozzle throat portion 16 toward the relatively cool region at the upstream end. It should be pointed out that the spray cooling concept of the invention is distinctly different from the known concept of film cooling in that, in the film cooling concept, the entire inner surface of the hot regions must be coated with a film of coolant for removing heat therefrom. In the present invention only the upstream end of the inner surface is sprayed with fuel and the fuel, after cooling this upstream surface, may be recombined with an oxidizer in the combustion chamber 12 and burnt up. Tests have shown that relatively high combustion efficiency can be achieved with the spray cooling concept of the invention and show that all the fuel used for cooling is recombined in the combustion process before it passes through the exhaust nozzle throat. It has been found through use of the present invention that temperature reductions of up to 1000° F. from initial temperatures of up to 3,000° F. can be produced in the nozzle throat area. As the nozzle throat area is the area subject to the highest temperatures, reduction in the temperature of this area will substantially increase the time which it takes this region to reach its erosion temperature. Thus, it will be apparent that through the use of the present invention the firing time and life of the rocket engine can be substantially increased.

It will be apparent from the above description that a novel and improved cooling system for the inner surface of a rocket engine or rocket structure is provided which is relatively simple in construction and efficient in operation. In the embodiment described, the invention makes efficient use of the liquid fuel used in operating the engine and additional liquid coolant is not required. However, it should be understood that a separate combustible coolant can be used instead of the fuel supply and that the invention is also applicable to hybrid type rocket engines using liquid and solid propellants in combination or solid fuel engines wherein the inner surface of the engine or nozzle portion is provided with a relatively high thermally conductive material.

While the invention has been described in detail in its present preferred embodiment, it will be obvious to those skilled in the art, after understanding the invention, that various changes and modifications may be made therein without departing from the spirit or scope thereof. It is intended in the appended claims to cover all of such modifications.

What is claimed is:

1. A rocket engine or the like of the type having a combustion chamber and a nozzle, the engine comprising:
   (a) an engine housing for the combustion chamber and nozzle;
   (b) a radially innermost layer for and supported within the housing, being highly thermally conductive at least in an axial direction, having an inner surface defining the nozzle and the combustion chamber and extending to a substantial portion of the radial thickness of the rocket so as to act as a heat sink to absorb heat; and
   (c) means for injecting propellants into the combustion chamber, the injecting means discharging a minor portion of the propellants onto a part of the highly conductive inner layer surface of the combustion chamber, said minor portion of the propellants flowing over said part of the combustion chamber surface causing at least a part of the heat absorbed by the inner layer at the nozzle throat portion of the nozzle to be conducted in a direction upstream therefrom thereby more effectively cooling the throat portion.

2. A rocket engine as recited in claim 1 wherein the injecting means includes:
   (a) means for injecting the major portion of the propellants into the combustion chamber; and
   (b) means for discharging said minor portion of the propellants onto said part of the combustion wall, the minor discharging means being separate and apart from the major injecting means so that said minor portion of the propellants can be drawn from a source separate from which the propellants are supplied, and the minor discharging means having, adjacent the major injecting means, at least one orifice for the discharging of said minor portion of the propellants therefrom.

3. A rocket engine, as recited in claim 1, wherein the inner layer is composed of anisotropic material, the material being arranged so that it is highly heat conductive in axial and radial directions with respect to the rocket engine axis.

4. A rocket engine, as recited in claim 3 further comprising:
   means for resiliently supporting the inner layer; and
   the inner layer further comprising a plurality of wedge-shaped segments disposed in side-by-side relationship forming an annulus, the resilient means resiliently permitting expansion of the segments.

5. A rocket engine as recited in claim 4 wherein the inner layer material is composed of pyrolytic graphite.

References Cited

UNITED STATES PATENTS

| | | | |
|---|---|---|---|
| 3,000,184 | 9/1961 | Fish | 60—258 |
| 3,224,193 | 12/1965 | Loprete et al. | 239—265.15 |
| 2,929,208 | 3/1960 | Schultz | 60—258 |
| 2,016,921 | 10/1935 | Goddard. | |

MARTIN P. SCHWADRON, *Primary Examiner.*

DOUGLAS HART, *Assistant Examiner.*

U.S. Cl. X.R.

60—39.66, 267